United States Patent
Yu

(10) Patent No.: US 10,582,130 B1
(45) Date of Patent: Mar. 3, 2020

(54) SYSTEM AND METHOD FOR CONNECTING A NETWORK CAMERA

(71) Applicant: Chengfu Yu, Irvine, CA (US)

(72) Inventor: Chengfu Yu, Irvine, CA (US)

(*) Notice: Subject to any disclaimer, the term of this patent is extended or adjusted under 35 U.S.C. 154(b) by 0 days.

(21) Appl. No.: 16/219,626

(22) Filed: Dec. 13, 2018

(51) Int. Cl.
*H04N 5/232* (2006.01)
*G06F 3/0484* (2013.01)
*G06F 3/0482* (2013.01)
*G06F 3/0485* (2013.01)
*G06F 3/01* (2006.01)

(52) U.S. Cl.
CPC ......... *H04N 5/23299* (2018.08); *G06F 3/017* (2013.01); *G06F 3/0482* (2013.01); *G06F 3/0485* (2013.01); *G06F 3/04845* (2013.01); *H04N 5/23245* (2013.01); *H04N 5/232933* (2018.08)

(58) Field of Classification Search
None
See application file for complete search history.

(56) References Cited

U.S. PATENT DOCUMENTS 9,785,247 B1* 10/2017 Horowitz .............. G06F 3/0346
2017/0163880 A1* 6/2017 Oshima .................. H04M 11/00

* cited by examiner

*Primary Examiner* — Eileen M Adams
(74) *Attorney, Agent, or Firm* — Arman Khosraviani

(57) ABSTRACT

A device comprising at least one memory, a processor, coupled to the at least one memory, one or more digital image sensors, one or more sensor modules, wherein at least one of the one or more sensor modules is exterior to the device housing and communicable to the processor, a controller to alternately toggle between and show media collected from the one or more digital image sensors and the one or more sensor modules, a display, wherein the display either alternates between, merges, or both the media as acquired from the one or more sensor modules and the one or more digital image sensors, a processor, coupled to the at least one memory, the processor is configured to cause the controller to send a first action upon detecting a first activity, and a second action upon detecting a second activity.

17 Claims, 6 Drawing Sheets

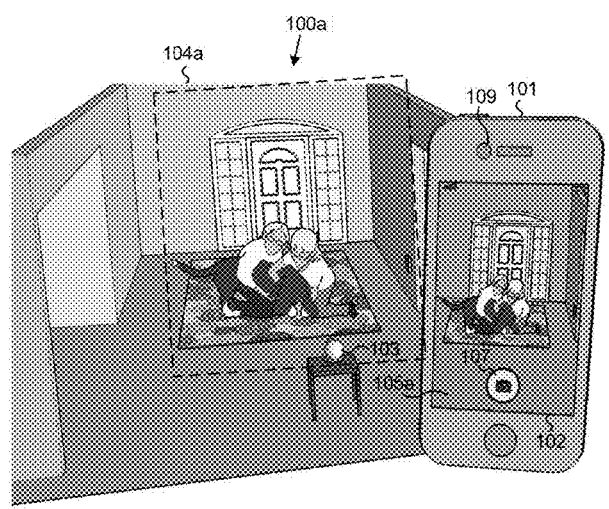 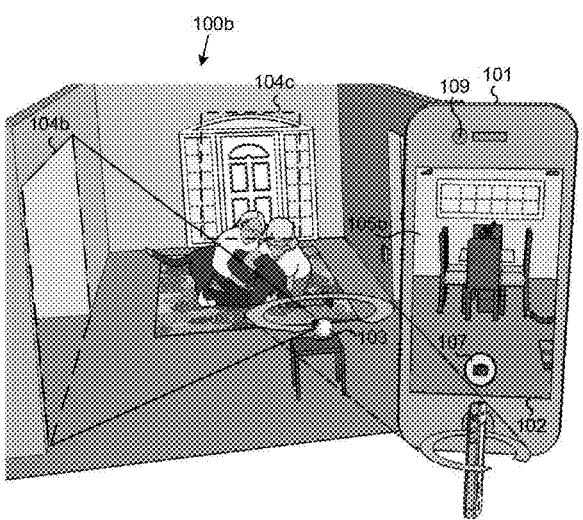
FIG. 1A   FIG. 1B

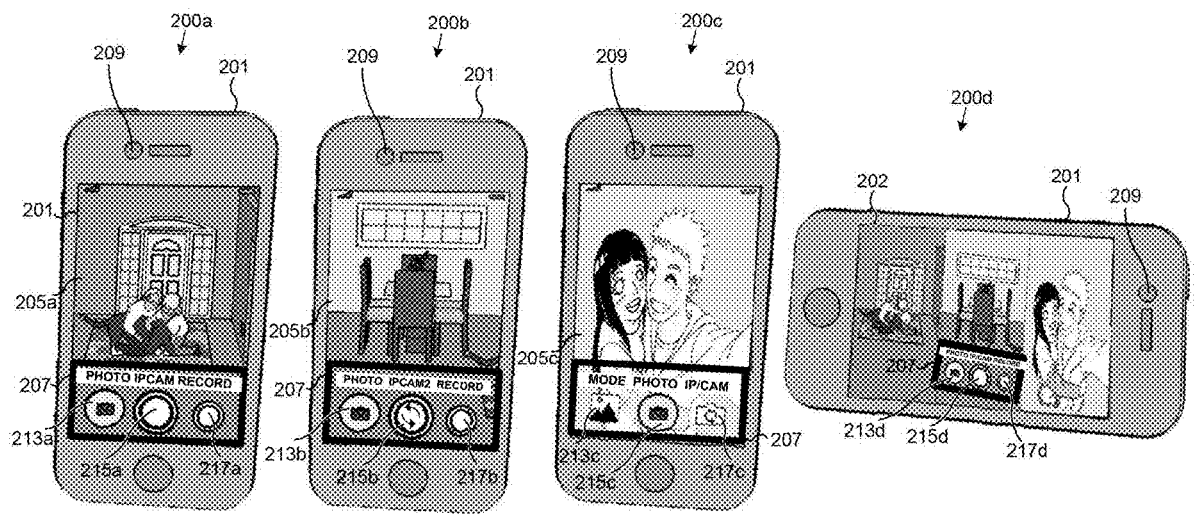

SYSTEM AND METHOD FOR CONNECTING A NETWORK CAMERA

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15,488,211 filed on Apr. 14, 2017; and entitled AN INTERACTIVE AUGMENTED-REALITY IoT DEVICES SYSTEMS AND METHODS. Nonprovisional patent application Ser. No. 15,490,826 filed on Apr. 18, 2017; and entitled GARAGE DOOR CONTROLLER AND MONITORING SYSTEM AND METHOD. Nonprovisional patent application Ser. No. 15,620,749 filed on Jun. 12, 2017; and entitled SMART REGISTER DEVICE AND METHOD. Nonprovisional patent application Ser. No. 15,625,601 filed on Jun. 16, 2017; and entitled SMART FAN AND VENTILLATION DEVICE AND METHOD. Nonprovisional patent application Ser. No. 15,680,146 filed on Aug. 17, 2017; and entitled DETERMINING A COMMUNICATION LANGUAGE FOR INTERNET OF THINGS DEVICES. Nonprovisional patent application Ser. No. 15,703,718 filed on Jun. 5, 2017; and entitled AUTONOMOUS AND REMOTE PAIRING OF INTERNET OF THINGS DEVICES UTILIZING A CLOUD SERVICE II. Nonprovisional patent application Ser. No. 15,818,275 filed on Nov. 20, 2017; and entitled AUTOMATED SMART DOORBELL DEVICE AND METHOD. Nonprovisional patent application Ser. No. 15,835,985 filed on Dec. 8, 2017; and entitled AUTONOMOUS AND REMOTE PAIRING OF INTERNET OF THINGS DEVICES UTILIZING A CLOUD SERVICE. Nonprovisional patent application Ser. No. 15,888,425 filed on Feb. 5, 2018; and entitled SMART PANEL DEVICE AND METHOD. Nonprovisional patent application Ser. No. 15,944,696 filed on Apr. 3, 2018; and entitled SMART TRACKER DEVICE AND METHOD. Nonprovisional patent application Ser. No. 16,056,276 filed on Aug. 6, 2018; and entitled SMART CAM DEVICE AND METHOD.

FIELD

The present disclosure generally relates to collecting visual information from a remote camera, and more particularly, to integrating streaming visual information from a remote camera within a native camera application of a computing device to allow the native camera application to alternately switch between the streaming visual information of the remote camera and the camera(s) of the computing device.

BACKGROUND

Current methods of monitoring remote cameras are using one or more security camera apps or applications installed on a computing device, or by using a network video recorder (NVR) connected to a plurality of wired or wireless cameras, the NVR being connected to a dedicated monitor to display all connected wired or wireless cameras. Users are very comfortable with taking photos using their phone or tablet, yet rarely go to open their remote camera app to take photos or videos to share experiences with friends, family, or others.

User interaction between cameras on a computing device and remote cameras are very disjoint and quite cumbersome. With the native camera app of a computing device, users have immediate access and control of their camera, but are burdened with switching between apps to access remote cameras. Moreover, users quickly become overwhelmed with complications in configuring multiple rooms and multiple cameras using multiple applications. These complications often lead to users missing a shot or experience.

SUMMARY

The disclosed subject matter relates to a network camera system device and method. The device comprising at least one memory, a processor, coupled to the at least one memory, one or more digital image sensors, one or more sensor modules, wherein at least one of the one or more sensor modules is exterior to the device housing and communicable to the processor, a controller to alternately toggle between and show media collected from the one or more digital image sensors and the one or more sensor modules, a display, wherein the display either alternates between, merges, or both the media as acquired from the one or more sensor modules and the one or more digital image sensors, a processor, coupled to the at least one memory, the processor is configured to cause the controller to send a first action upon detecting a first activity, and a second action upon detecting a second activity. The controller sends control commands to move, rotate, tilt, or pan at least one of the one or more sensor modules exterior to the device, the one or more sensor modules comprising of at least one camera external from the device. The controller commands are in response to an axis orientation of the device, wherein the one or more sensor modules exterior to the device to move, rotate, tilt, or pan according to changes in the axis orientation of the device.

The controller presents a rotate mode input icon on the display to indicate at least one or more sensor modules being operable to move, rotate, tilt, or pan. At least one of the one or more sensor modules rotate in the rotate mode according to the axis orientation of the device. The controller presents an IP/Cam mode input icon to toggle single and multi-view camera mode to display the media, wherein the media comprises of a space information, an individual information, or both, of a surrounding environment as acquired by one or more digital image sensors and the one or more sensor modules. The controller presents an IP/Cam record mode input to enable simultaneous, concurrent, or sequential capture of the media as acquired by the one or more digital image sensors and the one or more sensor modules.

The controller selectively stores the media collected from the one or more digital image sensors, the one or more sensor modules, or both in the at least one memory of the device. The first activity comprises of a user selection for collecting the media from the one or more digital image sensors and the one or more sensor modules, and the first action comprises of controlling the one or more digital image sensors and the one or more sensor modules to collect the media sequentially, or simultaneously, for a predetermined amount of time. The second activity comprises of a user selection for merging, discarding, or saving separately the selected media from the one or more digital image sensors and the one or more sensor modules, and the second action comprises of controlling the one or more digital image sensors and the one or more sensor modules to collect further media sequentially, or simultaneously, for a predetermined amount of time.

The method comprising collecting media by either one or more digital image sensors of a smart device, one or more sensor modules, or both, displaying user options by the smart device for toggling and selecting media between the one or more digital image sensors of the smart device, the one or more sensor modules, or both, detecting, by the smart device, a first activity and second activity, and performing a first action and second action, by the smart device, based on the detecting.

The method further comprising displaying user options for toggling and selecting the collected media between the one or more digital image sensors, the one or more sensor modules, or both. Displaying a list of user operations actions for live or recorded media for the selected at least one of the one or more digital image sensors, the one or more sensor modules, or both. Sending control commands by the smart device to move, rotate, tilt, or pan at least one of the one or more sensor modules.

The method further comprising moving, rotating, tilting, or panning the one or more sensor modules, wherein the commands are in response to an axis orientation of the smart device, wherein the one or more sensor modules move, rotate, tilt, or pan according to changes in the axis orientation of the device. The first activity comprises of a user selection for collecting the media from the one or more digital image sensors and the one or more sensor modules, and the first action comprises of controlling the one or more digital image sensors and the one or more sensor modules to collect the media sequentially, or simultaneously, for a predetermined amount of time. The second activity comprises of a user selection for merging, discarding, or saving separately the selected media from the one or more digital image sensors and the one or more sensor modules, and the second action comprises of controlling the one or more digital image sensors and the one or more sensor modules to collect further media sequentially, or simultaneously, for a predetermined amount of time.

The non-transitory machine-readable medium comprising instructions stored therein, which, when executed by one or more processors of a processing system cause the one or more processors to perform operations comprising collecting media by either one or more digital image sensors of a smart device, one or more sensor modules, or both, displaying user options by the smart device for toggling and selecting media between the one or more digital image sensors of the smart device, the one or more sensor modules, or both, detecting, by the smart device, a first activity and second activity, and performing a first action and second action, by the smart device, based on the detecting.

The non-transitory machine-readable medium comprising instructions stored therein, which, when executed by one or more processors of a processing system cause the one or more processors to perform operations comprising displaying user options for toggling and selecting the collected media between the one or more digital image sensors, the one or more sensor modules, or both. Displaying a list of user operations actions for live or recorded media for the selected at least one of the one or more digital image sensors, the one or more sensor modules, or both. Sending control commands by the smart device to move, rotate, tilt, or pan at least one of the one or more sensor modules.

The non-transitory machine-readable medium comprising instructions stored therein, which, when executed by one or more processors of a processing system cause the one or more processors to perform operations comprising moving, rotating, tilting, or panning the one or more sensor modules, wherein the commands are in response to an axis orientation of the smart device, wherein the one or more sensor modules move, rotate, tilt, or pan according to changes in the axis orientation of the device. The first activity comprises of a user selection for collecting the media from the one or more digital image sensors and the one or more sensor modules, and the first action comprises of controlling the one or more digital image sensors and the one or more sensor modules to collect the media sequentially, or simultaneously, for a predetermined amount of time. The second activity comprises of a user selection for merging, discarding, or saving separately the selected media from the one or more digital image sensors and the one or more sensor modules, and the second action comprises of controlling the one or more digital image sensors and the one or more sensor modules to collect further media sequentially, or simultaneously, for a predetermined amount of time.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

FIG. 1A illustrates an exemplary network camera system being implemented within a space of a structure in accordance with one or more exemplary embodiments of the present disclosure.

FIG. 1B illustrates another exemplary network camera system being implemented within a space of a structure in accordance with one or more exemplary embodiments of the present disclosure.

FIG. 2A illustrates an exemplary embodiment of the network camera system of FIG. 1A.

FIG. 2B illustrates an exemplary embodiment of the network camera system of FIG. 1B.

FIG. 2C illustrates another exemplary embodiment of the network camera system.

FIG. 2D illustrates another exemplary embodiment of the network camera system of FIG. 2B and FIG. 2C.

Figures 3A, 3B:
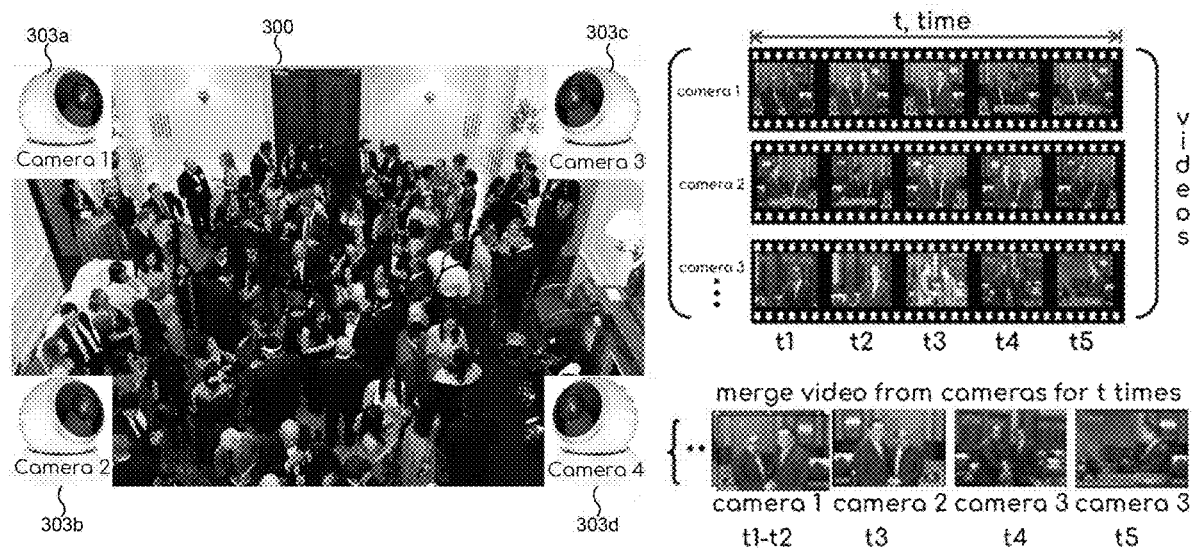
FIGS. 3A-3B illustrate an exemplary embodiment of a plurality of remote cameras of the exemplary network camera system collecting and communicating media information to one or more displays of a remote computing device in accordance with one or more exemplary embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale, and the proportions of certain parts have been exaggerated to better illustrate details and features of the present disclosure.

Various features of the present disclosure will now be described and is not intended to be limited to the exemplary embodiments shown herein. Modifications to these features and exemplary embodiments will be readily apparent to those skilled in the art, and the principles defined herein may be applied to other exemplary embodiments without departing from the scope of the disclosure.

FIG. 1A illustrates one exemplary embodiment of a network camera system 100a comprising remote computing device 101 coupled to one or more remote cameras 103 (hereinafter "camera 103" may refer to one, or two or more remote cameras) for presenting visual and audio information of region 104a acquired through the positioning of remote camera 103. Remote computing device 101 comprises a native camera application 107, one or more front, side, or rear facing camera 109 (hereinafter "camera 109"), and a display 102 for displaying various operations to a user within native camera application 107. The user may toggle between modes for controlling and accessing remote cameras 103 and camera 109 using, for example, the native camera application 107 of the remote computing device 101. Visual field 105a corresponding to region 104a, and visual field 105b corresponding to region 104b are displayed on display 102 of remote computing device 101.

FIG. 1B illustrates another exemplary embodiment of a network camera system 100a comprising remote computing device 101 coupled to a remote camera 103 for accessing and controlling visual and audio information of one or more regions 104a, 104b, and 104c acquired through the positioning of remote camera 103. As shown in FIG. 1B, remote computing device 101 may be communicatively coupled to remote camera 103 to move, tilt, rotate, or pan to provide visual and audio information of, for example, an alternative region 104c.

As shown in FIGS. 1A-1B, and FIGS. 2C-2D, the visual fields 105a, 205a and 105b, 205b of camera 103 may be combined with the visual field 205c of one or more front, side, or rear facing camera 109 of remote computing device 101, 201 to merge visual and audio information taken from one or more remote cameras 103 and/or one or more electronic devices 101 with visual and audio information taken from one or more cameras 109 of remote computing device 101.

Various methods may be used to combine viewing regions from remote cameras 103 and cameras 109, including streaming visual and audio information collected from one or more electronic devices 101, 201. Moreover, users may share access and control of various remote cameras 103 to enhance the user experience. For example, as shown in FIG. 1B, various viewing areas, angles, or regions 104a, 104b, and 104c, may be accessible by directly controlling camera 103 by using hand gestures on display 102, or by utilizing the positioning of remote computing device 101. Users may choose to rotate one remote camera 103 to take a photo or video of region 104b, while simultaneously taking a photo or video using camera 109.

In one exemplary embodiment of the present disclosure, the network camera system 100a may be accessible within the native camera application 107 to simplify access to multiple remote cameras 103 and camera 109 to allow users to direct and synchronize multiple photoshoots and video recordings by simultaneously accessing and controlling remote cameras 103 and camera 109. Thus, users may quickly access remote cameras 103 with a quick swipe or touch of the display 102 that accesses their native camera application 107.

FIGS. 2A-2D illustrate an exemplary embodiment of a user interface for a network camera system 200a-200d comprising remote computing device 201 communicatively coupled to one or more remote cameras 103 and cameras 209, for presenting visual and audio information of one or more regions 104a-104c acquired through the positioning of remote camera 103 and visual and audio information of camera 209 acquired through remote computing device 201.

FIG. 2A illustrates an exemplary network camera system 200a comprising of an exemplary modified native camera application 207 of the present disclosure. The modified native camera application 207 comprises a native photo taking button 213a, a video/audio record button 217a, and a remote camera button 215a. In FIG. 2A, operating the remote camera button 215a updates the visual field 205a of remote computing device 201 with the visual region 104a of remote camera 103. Users may toggle between camera 209 and one or more remote cameras 103 by pressing remote camera button 215a or through various other user interactions (e.g. facial or image recognition, fingerprint, or swiping or hand gestures on display 201) to immediately access and operate, one or more remote cameras 103 and/or camera 209 of remote computing device 201. Thereafter, users may use various interactions (e.g. facial or image recognition, fingerprint, or swiping or hand gestures on display 201) to control remote cameras 103 to view any accessible region, for example, region 104a.

FIG. 2B illustrates an exemplary network camera system 200b comprising of an exemplary modified native camera application 207 of the present disclosure. The modified native camera application 207 comprises a native photo taking button 213b, a video/audio record button 217b, and a modified remote camera button 215b indicating one or more remote cameras 103 capable of motion, tilt, zoom, rotate, or pan control through the modified native camera application 207. Users may toggle to one or more remote cameras 103 capable of pan, tilt, zoom, rotation, etc., by pressing remote camera button 215b or through various other user interactions (e.g. facial or image recognition, fingerprint, or swiping or hand gestures on display 201) to immediately access and operate, one or more remote cameras 103 and/or camera 209 of remote computing device 201. Thereafter, users may use various interactions (e.g. facial or image recognition, fingerprint, or swiping or hand gestures on display 201) to control remote cameras 103 to view any accessible region, for example, region 104a.

FIG. 2C illustrates an exemplary network camera system 200c comprising of an exemplary modified native camera application 207 of the present disclosure. The modified native camera application 207 comprises a native photo taking button 215c, a mode button 213c, and a camera merge and toggle button 217c. The mode button 213c may allow users to add, for example, geo-tags, geo-filters, photo and video filters, effects, or adjust lighting and color properties of one or more photos or videos acquired from cameras 103 and cameras 209. The camera merge and toggle button 217c may merge one or more remote cameras 103 of FIGS. 2A-2B with one or more cameras 209 of remote computing device 201.

As shown in FIG. 2D, the operation of camera merge and toggle button 217c merges regions 104a and 104b with the visual field 205c from the one or more front, side, or rear facing camera 209 of remote computing device 201. The display 202 is updated showing regions 104a, 104b, and visual field 205c, and the modified native camera application 207 is updated to show camera operations, for example, a native photo taking button 215d that may be configured to simultaneously take one or more photos from cameras 103 and 209. Similarly, a native video and audio recording button 217d, that may be configured to simultaneously take one or more videos from cameras 103 and 209 (as shown in FIGS. 3A-3B). Thereafter, users may use various interactions (e.g. facial or image recognition, fingerprint, or swiping or hand gestures on display 201) to control remote cameras 103 and 209 to pan, zoom, or otherwise view any accessible region, for example, region 104a, 104b, 104c, or visual field 205c of camera 209.

Users may operate camera toggle button 215d to toggle to one or more front, side, or rear facing cameras 209 or remote cameras 103 capable of pan, tilt, zoom, rotation, etc., by pressing remote camera button 215b or through various other user interactions (e.g. facial or image recognition, fingerprint, or swiping or hand gestures on display 201) to immediately access and operate, one or more remote cameras 103 and/or camera 209 of remote computing device 201.

FIGS. 3A-3B illustrate one exemplary embodiment of a network camera system for seamlessly combining and filtering video streams from a plurality of remote cameras 303a-303d. As shown in FIG. 3A, each camera 303a, 303b, 303c, and 303d captures visual and audio information from an area of a space 300. The visual and audio information from each camera 303a-303d is then sent to the remote computing device 201 for processing, and then displayed on the modified native camera application 207 for user customization, for example, geo-tagging, geo-filters, photo and video filters, effects, or adjust lighting and color properties of one or more photos or videos acquired from cameras 303a-303d and cameras 209.

FIG. 3B illustrates one exemplary embodiment for selecting and combining video streams taken from remote cameras 303a-303d of space 300. As shown in FIG. 3B, users may select video sections from each camera 303a, 303b, 303c, and 303d from various recording times t1-t5. Each video section may comprise of video and/or audio taken from one or more remote cameras 103 or one or more cameras 209 processed by one or more remote computing device 201. The user may then take individual video sections and merge them to form one or more composite video files.

Thus, each video section corresponds to video and/or audio taken from one or more cameras (camera1, camera2, etc.,) for one or more recording durations (t1, t2, etc.,). As shown in FIG. 3B, recording durations t1-t5 are synchronized, however, recording durations or camera recordings need not be limited to synchronized or simultaneous recording, remote cameras may be set to begin recording based on a user defined schedule within the modified native camera application 207. Each video section may be derived from one or more remote cameras 103 or from one or more cameras of one or more remote computing devices 201. The user may select individual video sections for user customization and combine video sections to one or more composite video files.

As shown in FIGS. 1A-1B, 2A-2D, and 3A-3B, remote computing device 201 may be coupled to one or more remote cameras 303a-303d for controlling each remote camera 303a-303d to collect visual and audio information of one or more spaces, for example, space 300. Video streams or still photos may be taken by and selected from one or more remote cameras 303a-303d, one or more cameras 209 of one or more other remote computing devices 201, or both.

Users may toggle to one or more remote cameras 303a-303d capable of pan, tilt, zoom, rotation, etc., by pressing remote camera button 215b or through various other user interactions (e.g. facial or image recognition, fingerprint, long press, or swiping or hand gestures on display 201) to immediately access and operate, one or more remote cameras 303a-303d and/or camera 209 of remote computing device 201. Thereafter, users may use various interactions (e.g. facial or image recognition, fingerprint, or swiping or hand gestures on display 201) to control remote cameras 303a-303d to view any accessible region of space 300.

The user may select among the collected visual information from the one or more remote cameras 303a-303d and/or camera 209 of remote computing device 201 to merge, amend to another video file or video clip, discard one or more video clips, or save separately the one or more video clips.

Figure 4:
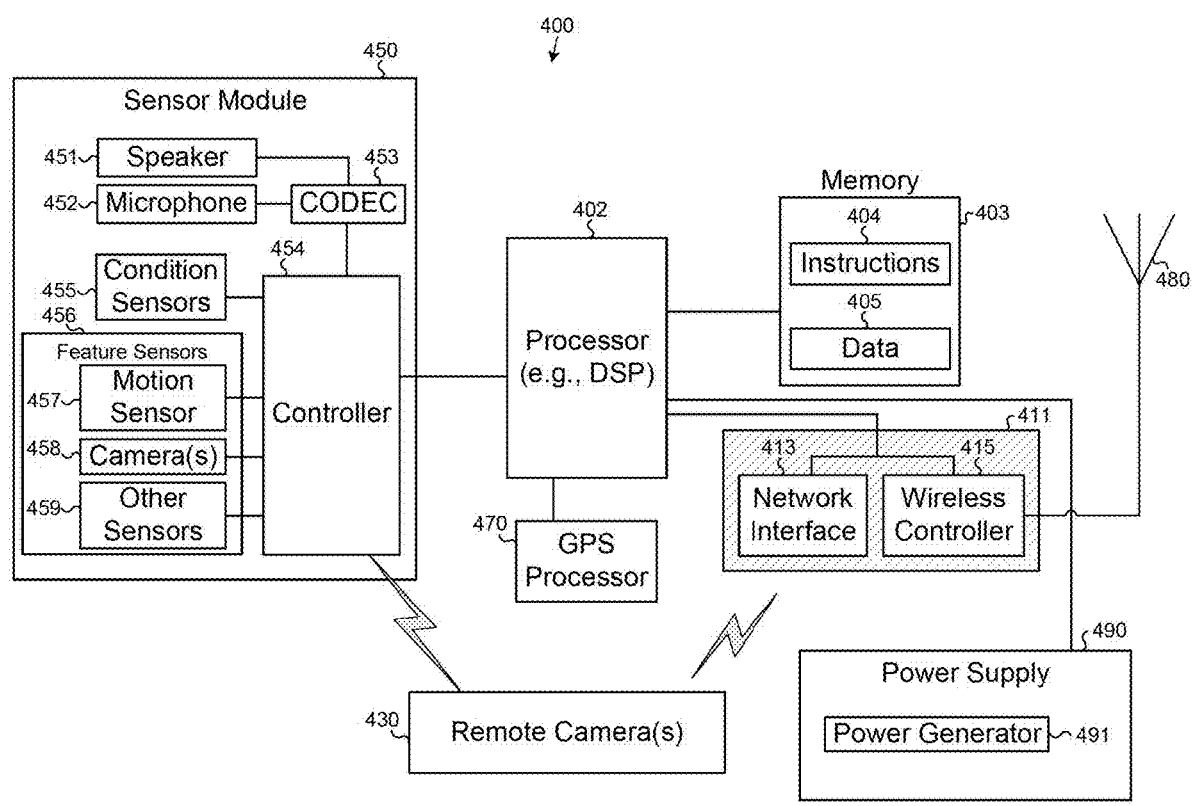
FIG. 4 illustrates an exemplary embodiment of the internal components of the network camera system in accordance with one or more exemplary embodiments of the present disclosure.

FIG. 4 illustrates conceptually an exemplary network camera system device 400 with which some exemplary embodiments of the present disclosure may be implemented. The exemplary network camera system device 400 may be any sort of electronic device that transmits signals over a network, such as electronic devices embedded in smart appliances and other smart systems. The exemplary network camera system device 400 may include various types of computer readable media (e.g., a non-transitory computer-readable medium) and interfaces for various other types of computer readable media. The exemplary network camera system device 400 may include one or more cameras 458 and communicably coupled to one or more remote cameras 430. The network camera system device 400 may comprise of a remote computing device 201 having a processor, memory, network interface, GPS, power supply, etc., communicably coupled to one or more cameras 209 (e.g. sensor modules 450), and remote computing device 201 and network camera system device 400 may be used interchangeably in the present disclosure.

The exemplary network camera system device 400 includes a processor 402 and memory/storage 403. The processor 402 may retrieve and execute instructions 404 and/or data 405 from memory/storage 403 to perform the processes of the present disclosure. Processor 402 may be a single processor, a multi-core processor, or multiple processors in different implementations.

Figure 5A:
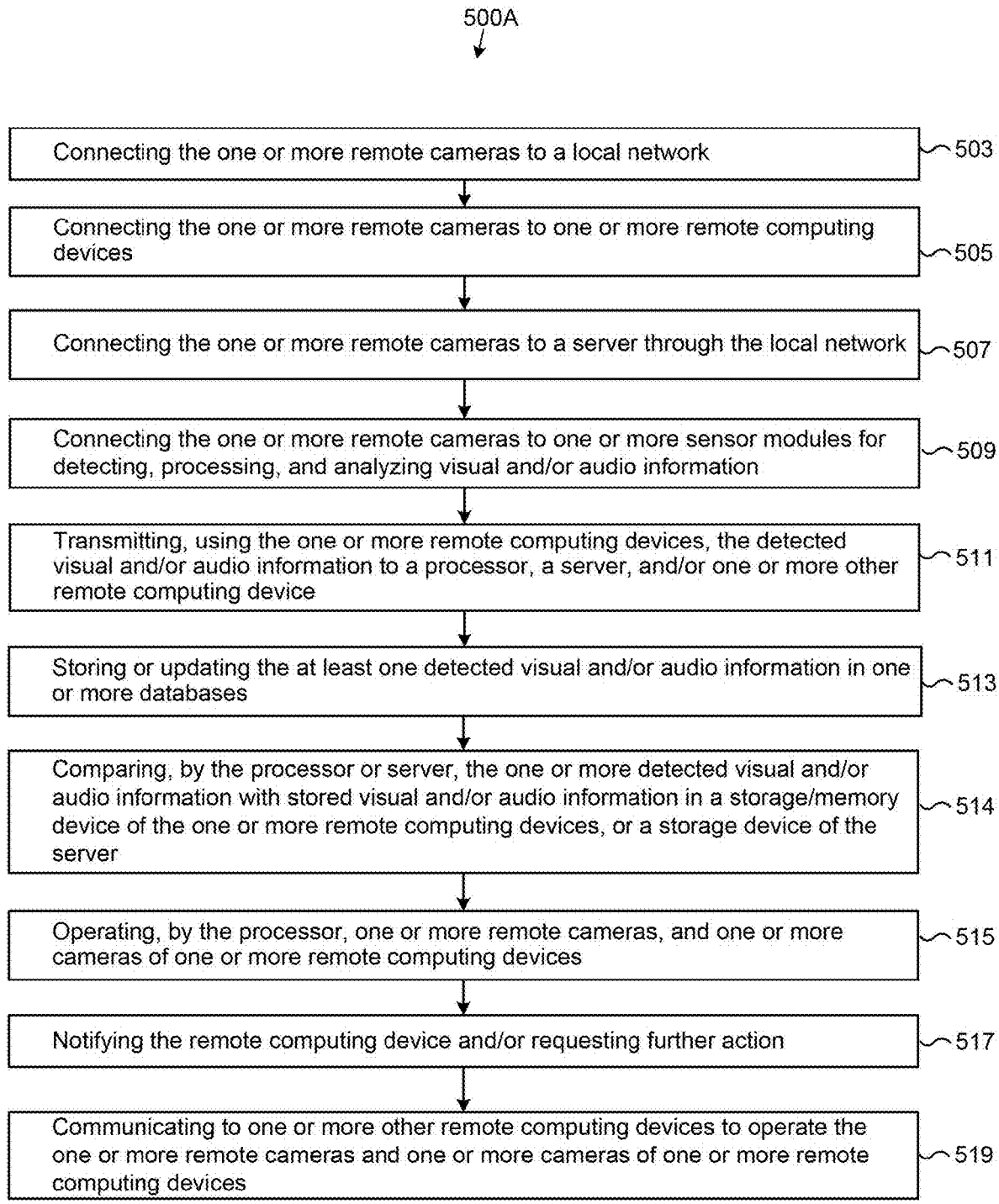
FIGS. 5A-5B illustrate an exemplary embodiment of a flowchart of interactions and operations of the network camera system.

Instructions and data for operating network camera system device 400 may be stored on, transmitted from, or received by any computer-readable storage medium (e.g., memory/storage of remote cameras 430) storing data (e.g., data 405) that is accessible to a processor (e.g., the processor of remote cameras 430) during modes of operation of the network camera system device 400. The network camera system device 400 may access and execute instructions 404 and/or data 405 stored on any remote computing device (e.g. remote cameras 430). The data 405 may be a method instruction as depicted in FIGS. 5A-SB. The method instructions are executable by processor 402, where the instructions include steps on how to remotely operate and configure one or more remote cameras 430 (corresponding to 303a-303d of FIGS. 3A-3B, and the like, as disclosed in the present disclosure).

The memory/storage 403 may include a dynamic random-access memory (DRAM) and/or a read-only memory (ROM). Memory/storage 403 may provide a temporary location to store data 405 and instructions 404 retrieved and processed by processor 402. Memory/storage 403 may include a non-volatile read-and-write memory that stores data 405 and instructions 404, even when Wi-Fi/Internet is off, that may be retrieved and processed by processor 402. For example, memory/storage 403 may include magnetic, solid state and/or optical media, memory/storage 403 may be a single or multiple memory units as necessary. The memory/storage 403 stores all collected visual, audio, textual, voice, motion, heat, temperature, humidity, air quality, proximity, etc., information provided directly from the network camera system device 400 or the one or more remote cameras 430, or indirectly through a wireless connection to another electronic device(s), sensor(s), or sensor module(s) 450 (e.g. a remote computing device comprised of one or more sensors).

The exemplary network camera system device 400 couples to a network through a network interface 413. In some aspects, network interface 413 is a machine-interface. In this manner, the network camera system device 400 may be a part of a network of computers, a local area network (LAN), a wide area network (WAN), or an Intranet, or a network of networks, for example, the Internet. A wireless controller 415 may be coupled to the processor 402. The wireless controller 415 may be further coupled to an antenna 480. The network module 411 may be integrated as system-in-package or system-on-chip device and/or collectively defined as having the network interface 413 and wireless controller 415. Network interface 413 and wireless controller 415 integrated into the network module 411 and being coupled to an antenna 480. Any or all components of network camera system device 400 may be used in conjunction with the subject disclosure. The network interface 413 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

A sensor module 450 may be communicably coupled to the exemplary network camera system device 400. The sensor module 450 may be coupled to network camera system device 400, formed on network camera system device 400, or remotely connected to network camera system device 400. The sensor module 450 may include and control various sensor components for sensing interior and exterior environmental conditions (e.g. temperature, humidity, air quality, smoke, CO, $CO_2$, etc.). Sensor components may monitor environmental conditions by using one or more condition sensors 455, motion sensors 457, cameras 458, and other sensors 459 (e.g. heat, occupancy, lighting, ambient lighting, etc.). Motion sensors 457 may include, for example, orientation, velocity, acceleration, heading, direction, or axis of the network camera system device 400. The sensor modules 450, network camera system device 400, and remote cameras 430 may collect media or media information which may be defined as including, for example, interior and exterior environmental conditions, visual, spatial, and audio information, infrared, ultrasonic, radio frequency, and microwave signals, etc., based on the type of sensors implemented in each device.

A combination of sensor components may be implemented to provide comprehensive video and audio monitoring or improved accuracy in monitoring interior and exterior environmental conditions. Moreover, individual sensor components from sensor module 450 may be separately coupled to network camera system device 400, formed on network camera system device 400, or remotely connected to network camera system device 400. In some exemplary embodiments, some sensor components may be grouped together to form a second or additional sensor modules. In certain embodiments, some sensor components of sensor module 450 (e.g. motion sensor 457) may instead be formed on the network camera system device 400. Further, in some embodiments, some sensor components of sensor module 450 (e.g. infrared sensor, other sensors 459) may also be formed on the network camera system device 400 to provide additional or supplemental monitoring.

Referring to FIGS. 3A-3B and FIG. 4, data collected from sensor components ("sensory data") of network camera system device 400 may be used together with sensory data from the one or more cameras 458 and/or the one or more remote cameras 430 for camera selection and operation of remote cameras 430 (e.g. selecting a closer camera 303d in space 300 based on motion or audio detection to collect video or audio) of one or more cameras remote cameras 430 (e.g. cameras 303a-303d) in an environment (e.g. space 300). Moreover, a user may select from cameras 303a-303d to use together with camera 458 to extend the viewing angle for collecting visual information in space 300 of an event. The user may decide to simultaneously collect or record visual information from space 300 using one or more cameras 430, one or more cameras 458, or both based on sensory data collected from sensor components of network camera system device 400, a schedule, or user preference.

The network camera system device 400 may use collected sensory data of space 300 to determine whether to access, operate, or send notifications for cameras 303a-303d from within the modified native camera app 207 to allow the user, for example, to quickly focus on an event, motion, or action. For example, the user may take a self-portrait using one or more cameras 458 and simultaneously take photos of space 300 using different cameras 303a-303d and viewing angles within the modified native camera app 207.

Moreover, the network camera system device 400 may use collected sensory data together with learned user behavior to focus on an event, motion, or action within space 300. For example, as shown in FIG. 3A, the location and orientation of camera 303d may be used together with motion, sound, or other sensors of cameras 303a-303d to determine a suitable camera 303a-303d to record video or collect visual and audio information. The network camera system device 400 may take such collected sensory information and prioritize camera 303a-303d selection for collecting visual and audio information of space 300 based on user preference, learned user behavior, or collected sensory data.

Condition sensors 455 may detect and collect information about environmental conditions in space 300. Condition sensors 455 may include but not be limited to, for example, temperature sensor, ambient light sensor, humidity sensor, barometer sensor, air quality sensor (e.g. for detecting allergens, gas, pollution, pollen, etc.), infrared sensor, $CO_2$ sensor, CO sensor, piezoelectric sensor, airflow or airspeed sensor. The sensor components 455-459, etc., may be used by the processor 402 of the network camera system device 400 to determine how to operate or when to access remote cameras 430 in space 300.

Other sensors 459 may detect and collect information about environmental features in space 300. Other sensors 459 may include, for example, a proximity sensor, occupancy sensor, ambient light sensor. Microphone 452 and speaker 451 may be used to control cameras 303a-303d, for example, the user may make verbally requests to the exemplary network camera system device 400, for example, to the native camera app 207, to access one or more cameras 303a-303d for display on network camera system device 400.

The sensor module 450 includes a controller 454 for controlling sensors 455-459 and processing data collected by the sensors. Controller 454 may include a processor, memory/storage device (storing sensor instructions, settings, etc.), and a network module wireless chip for directly communicating with one or more remote cameras 430 connected to the network. Controller 454 may send measured/detected environmental conditions from cameras 430 and cameras 458 to the processor 402 for further processing. Alternatively, processor 402 may send measured/detected environmental conditions from one or more remote cameras 430 to controller 454 for further processing, or processor 402 may allocate or share processing power of sensory data with controller 454. Controller 454 may then send control commands to processor 402, or directly to remote cameras 430, to operate or access one or more remote cameras 430.

One or more cameras 458 of network camera system device 400 may also capture visual information such as video and still images of the surrounding environment which may be coupled to controller 454 for determining how to operate one or more remote cameras 430 to capture visual information that may be sent to the processor 402. The controller 454 may be coupled to the processor 402 for processing visual information. The processor 402 may provide visual information captured from the camera 458 to any electronic device which may facilitate interaction or communication with a person or an object positioned within a vicinity of the network camera system device 400. The camera 458 may be any optical instrument for recording or capturing images that may be stored locally, transmitted to another location, or both. The images may be still photographs, or sequences of images forming videos or movies. The camera 458 may be any type of camera, for example, high-end professional camera type, digital camera, panoramic camera, fish-eye lens type camera, multi-lens type camera, VR camera, etc.

The sensor module 450 may be powered by a power supply 490. The power from the power supply 490 may be provided by disposable batteries or rechargeable batteries, for example, nickel cadmium (NiCd), lithium (Li), AA, AAA, and/or rechargeable capacitors, for example, supercapacitors (SC) or ultracapacitors. The power supply 490 may supply power to sensor module 450 by, for example, a power adapter for connecting to an outlet, a solar panels/cell, or any other renewable/alternative power supply source. The sensor module 450 may use multiple battery types, for example, using a coin cell battery to operate some sensor components or to provide auxiliary power.

The sensor module 450 may include a speaker 451 and microphone 452 for communicating with a user or receiving control commands from a user positioned within a vicinity of the network camera system device 400. The speaker 451 and microphone 452 may be coupled to a CODEC 453. The coder/decoder (CODEC) 453 may also be coupled to the processor 402 through a controller 454. The processor 402 may provide audio information captured from the microphone 452 to any electronic device (e.g. remote cameras 101 or 201) as shown in FIGS. 1A-1B and FIGS. 2A-2D, that may facilitate communication with an individual positioned within a vicinity of one or more remote cameras 430.

In an exemplary embodiment, the network camera system device 400 and/or sensor module 450 comprises at least one motion sensor 457 for detecting motion information. For example, motion sensor 457 may detect moving objects and/or pedestrians. The motion sensor 457 may be a passive infrared motion detector. Infrared motion sensors are also known as PIR (passive infrared) motion sensors or simply PIR sensors. Such detectors have about a 120° arc and about a 50-foot range detection zone. In the case where an increased field of view of motion detection or more accurate motion detection is required, two or more motion detectors may be used.

Suitable alternate motion detectors may also be used, such as ultrasonic, optical, microwave, or video motion detectors. Additional alternative types of motion detectors may also be used to sense intrusion including laser scanning or frequency sensitive detectors, commonly referred to as "glass breaks". Motion sensor 457 may include image sensors having any type of low light level imaging sensors used for surveillance and unmanned monitoring in daylight to complete darkness, for example, low-light complementary metal-oxide-semiconductor (CMOS) or charge-coupled device (CCD) image sensors.

The motion sensor 457 may also be complemented with other devices to aid in detecting motion such as, for example, photocell sensors, cadmium-sulfide (CdS) cells, light-dependent resistors (LDR), and photoresistors. In addition to motion sensors, the photo cell sensors may be used to determine if there something in front of a sensor or a series of sensors that block light. The sensitivity of the motion sensor and photocell may be adjusted through, for example, an application on an electronic device (e.g. smart device or laptop). Also, a server or application may decide if the situation or application warrants night use or twenty-four-hour operation of motion detection through alternate means such as photocell sensors. If night operation is selected, then the server or application will process detected photocell information to determine if motion was detected.

The sensor module 450 may include any number of other detectors or other sensors 459. Examples of other sensors 459 that may be used include, by way of illustration only and not by way of limitation, temperature sensors, video cameras, audio recorders, motion sensors, ambient light sensors, light sensors, humidity sensors, smoke detectors, and other sensors, such as for example, an Electric Field Proximity Sensing (EFPS) sensor to determine whether a person or object is nearby that is behind a wall.

The network camera system device 400 includes a power supply 490 having a power generator 491 as a power source. The power generator 491 may include rechargeable batteries, for example, nickel cadmium (NiCd), lithium (Li), AA, AAA, and/or rechargeable capacitors, for example, supercapacitors (SC) or ultracapacitors. The power generator 491 may comprise of multiple battery types, for example, using a coin cell battery to operate some sensor components or to provide auxiliary power, while using a rechargeable Li battery to provide power for operating sensor module 450.

The exemplary one or more remote cameras 430 of the present disclosure need not be limited to simple camera components, for example, a microphone, speaker, and lens. The one or more remote cameras 430 may comprise of all components of sensor module 450.

Figure 5B:
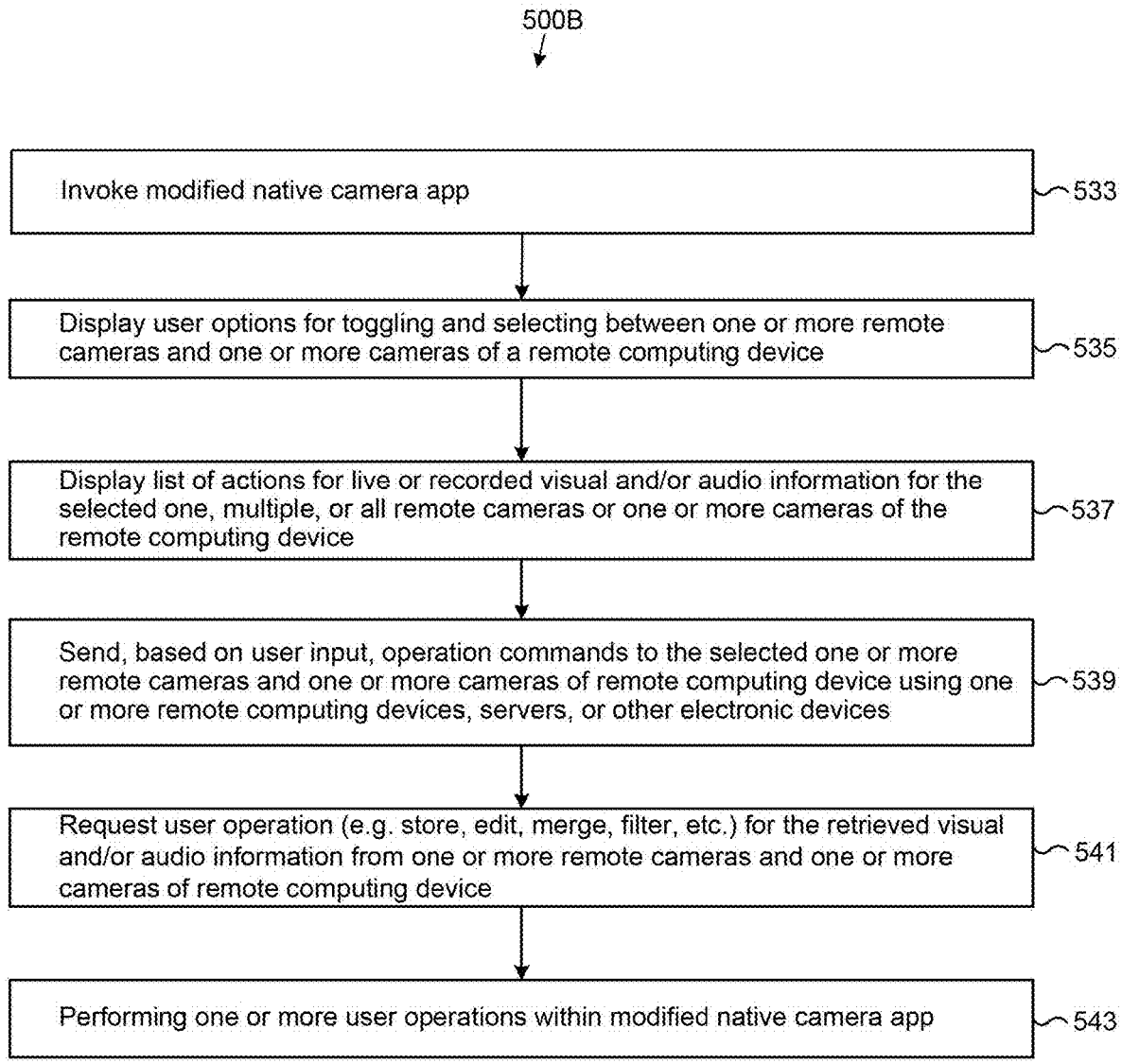

FIGS. 5A-5B illustrate a first exemplary method 500A and 500B of using the network camera system device 400 in accordance with one or more embodiments of the present disclosure. Method may apply to other exemplary embodiments of the network camera system device as disclosed in FIGS. 1-4. Method 500A may be used independently or in combination with method 500B for operating one or more remote cameras, computing devices, smart devices, or other electronic devices or components. For explanatory purposes, the example process 500A and 500B are described herein with reference to remote computing device 201, one or more cameras 209, and one or more remote cameras 103 and 303a-303d of FIGS. 1A-1B, 2A-2D, and 3A-3B; however, the example process 500A and 500B is not limited to remote computing device 201, one or more cameras 209, and one or more remote cameras 103 and 303a-303d, and the example process 500A and 500B may be performed by one or more computing devices, smart devices, or other electronic devices or components as disclosed in the cross-referenced applications incorporated by reference. Further for explanatory purposes, the blocks of the example process 500A and 500B are described herein as occurring in serial, or linearly. However, multiple blocks of the example process 500A and 500B may occur in parallel. In addition, the blocks of the example process 500A and 500B may be performed a different order than the order shown and/or one or more of the blocks of the example process 500A and 500B may not be performed. Further, any or all blocks of example process 500A and 500B may further be combined and done in parallel, in order, or out of order. The blocks of process 500A may be mixed with the blocks of process 500B.

Each block shown in FIG. 5A represents one or more processes, methods or subroutines, carried out in the exemplary method. FIGS. 1-4 show exemplary embodiments of carrying out the methods of FIG. 5A for detecting, collecting, processing, and transmitting information. The exemplary method may begin at block 503.

Referring to FIG. 5A, the exemplary method of using the network camera system device 400 may begin with connecting the one or more remote cameras 303a-303d to a local network at block 503, followed by block 505 of connecting the one or more remote cameras 303a-303d to one or more remote computing devices 209, one or more servers, electronic devices, defined by the user, or any combination thereof. The process is followed by connecting the one or more remote cameras to a server through the local network at block 507. The first activity (e.g. still images or video streams) and all subsequent activities may be collected and stored on one or more storage device (e.g. locally accessibly storage 402 or remotely accessibly storage of the remote cameras 303a-303d) or through a server connection as shown in block 507.

The first activity and all subsequent activities may be collected, streamed or broadcast, and/or recorded at any time (e.g. concurrently with, prior to, or after any block) in process 500A or process 500B. Moreover, at any time (e.g. concurrently with, prior to, or after any block) in process 500A or 500B, the activity may be collected, stored, updated or allocated within a database of the network camera system device 400, the remote computing device 201, one or more servers, electronic devices, defined by the user, or any combination thereof.

The process is followed by block 509 of connecting the one or more remote cameras 303a-303d to one or more sensor modules for detecting, processing, and analyzing visual and/or audio information.

The process is followed by block 511 of sending a notification alert and information about the first activity (e.g. visual information, audio information, etc.,) to the network camera system device 400, one or more remote computing devices 201, servers, electronic devices, or any combination thereof.

The process is followed by storing or updating the at least one detected visual and/or audio information in one or more databases of the network camera system device 400, one or more remote computing devices 201, servers, electronic devices, or any combination thereof at block 513.

The process is followed by block 514 of comparing, by the processor 402 or server, the one or more detected visual and/or audio information with stored visual and/or audio information in a storage/memory 403 of the network camera system device 400, one or more remote computing devices 201, servers, electronic devices, or any combination thereof.

The process is followed by block 515 of operating, by the processor 402, the network camera system device 400, one or more remote computing devices 201, servers, electronic devices, or any combination thereof.

The process is followed by block 517 of notifying the remote computing device and/or requesting further action by the processor 402, the network camera system device 400, one or more remote computing devices 201, servers, electronic devices, or any combination thereof.

The process is followed by block 519 of communicating to one or more other network camera system device 400, one or more remote computing devices 201, servers, electronic devices, or any combination thereof to operate the one or more remote cameras 303a-303d, one or more cameras 209 of one or more remote computing devices 201, or any combination thereof.

In process 500A and 500B regions 104a, 104b, 104c may be generated by the remote computing device 201, remote cameras 303a-303d, one or more servers, electronic devices, defined by the user, or any combination thereof. Moreover, in process 500A and 500B, one or more sensors from the network camera system device 400 or remote cameras 303a-303d, may be used to collect, for example, audio information, visual information, and environmental information to enable image or voice recognition technology. The sensors may be one or more of a speaker, a microphone, a camera, or a motion sensor, temperature sensor, humidity sensor, and wind sensor. The sensitivity of the sensors may be adjusted (or accounted for) to discriminate between the presence of a human being and other living beings in the first zone and the second zone.

In the process 500A and 500B the visual and audio information may be analyzed prior to collecting audio, video, still images. For example, the visual and audio information may be analyzed by the network camera system device 400 or remote cameras 303a-303d to determine if the activity involves human beings or other living beings prior to performing process of block 515, block 517, or block 519.

Each block shown in FIG. 5B represents one or more processes, methods or subroutines, carried out in the exemplary method. FIGS. 1-4 show exemplary embodiments of carrying out the methods of FIG. 5B for detecting, collecting, processing, and transmitting information stored on, transmitted from, or received by the network camera system device 400. Referring to FIG. 5B, the exemplary method of using the network camera system device 400 may begin at block 533.

The process may begin at block 533 of invoking the modified native camera 207 application using the network camera system device 400, followed by process of displaying user options for toggling and selecting between one or more remote cameras 303*a*-303*d* and one or more cameras 209 of a remote computing device 201 at block 535.

The process is followed by block 537 of displaying a list of actions for live or recorded visual and/or audio information for the selected one, multiple, or all remote cameras 303*a*-303*d* or one or more cameras 209 of the remote computing device 201.

The process is followed by block 539 of sending, based on user input, operation commands to the selected one or more remote cameras 303*a*-303*d* and one or more cameras 209 of remote computing device 201 using one or more remote computing devices 201, servers, or other electronic devices.

The process is followed by block 541 of requesting user operation (e.g. store, edit, merge, filter, etc.) for the retrieved visual and/or audio information from one or more remote cameras 303*a*-303*d* and one or more cameras 209 of remote computing device 201.

The process is followed by block 543 of performing one or more user operations within modified native camera app 207.

A remote computing device may be a smart device, a smart phone, a vehicle, a tablet, a laptop, a TV, or any electronic device capable of wirelessly connecting to a network or joining a wireless network. The remote computing device may be wirelessly and communicably associated to an individual either through a network or server (e.g. through a user account on the server, or WiFi™ login information), or through visual information collected by the SRV device. The terms remote computing device, individual, and user may be used interchangeably throughout the present disclosure.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or files over a network. The server may be any computer configured to act as a server (e.g. a desktop computer, or single or multiple rack-mountable servers) and accessible remotely using remote access software.

Proximity determination may be made by using a combination of visual, motion, and audio information. The sensor components or sensor modules, server, remote computing device, and/or CAT system may define a virtual perimeter for a real-world geographic area. The CAT system may also respond to geofencing triggers. Geofencing may be accomplished using location aware devices through, for example, GPS, RFID technology, wireless network connection information, cellular network connection information, etc. Visual, motion, and audio information may be collected by the CAT system or server to substantiate an individual(s)/remote computing device(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity", "a vicinity", "within a vicinity", "within a predetermined distance", and the like may be defined between about 0.01 meters and about 3 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching individual as the individual nears one or more network camera system devices, cameras, sensors, or a traceable object used in determining environmental features and/or conditions. The predefined distance may be defined as between about 0.01 meter and about 3 meters.

The terms "predefined" or "predetermined" period of time may be defined to be between about 0.5 second to about 10 minutes.

The processor of the network camera system devices, cameras, sensor modules, remoting computing device, or server may perform an action (e.g. first, second, third, etc.) comprising of a single action, set of actions, or a list or blend of actions based on one or more of: a proximity of an individual(s) or remote computing device(s), a time of day, environmental activity and/or environmental features, visual, motion, or audio information, a schedule, user(s) preferences, and the state and settings of entry point devices, the network camera system device, and local electronic devices, as described above. The action may be any one of: locking/unlocking the smart lock, operating smart lights, fully or partially opening one or more garage doors, ringing a digital smart doorbell chime, ringing a manual in-building mechanical or digital doorbell chime, operating a thermostat, smart TV, or other local electronic devices. The action may also include playing a music file, sound file, greeting, or message in response to a detected change in occupancy and/or environmental conditions and/or features, or in response to a detected or defined audio, proximity, visual, or motion trigger. The action may also comprise of controlling other smart devices as communicated through the network camera system device, cameras, sensor modules, remote computing devices, or servers, for example, turning on a ceiling fan, outlet, and communicating with remote computing device(s) or detected individual(s). The action may also comprise of sending an email, text, or SMS to a server, smart devices, or remote computing device(s).

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the SRV device, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed:

1. A device comprising:
   at least one memory;
   a processor, coupled to the at least one memory;
   one or more image sensors;
   one or more sensor modules, wherein at least one of the one or more sensor modules is exterior to the device housing and communicable to the processor, wherein the at least one exterior sensor module moves, rotates, tilts, or pans according to changes in the axis orientation of the device;
   a controller to alternately toggle between and show media collected from the one or more image sensors and the one or more sensor modules;
   wherein the controller sends control commands to move, rotate, tilt, or pan the at least one exterior sensor module;
   wherein at least one of the controller commands is responsive to an axis orientation of the device;
   a display, wherein the display either alternates between, merges, or both the media as acquired from the one or more sensor modules and the one or more image sensors;
   wherein the controller presents a rotate mode input icon on the display to indicate at least one or more sensor modules being operable to move, rotate, tilt, or pan;
   wherein the controller presents an IP/Cam mode input icon to toggle single and multi-view camera mode to display the media, wherein the media comprises of a space information, an individual information, or both, of a surrounding environment as acquired by one or more image sensors and the one or more sensor modules;
   a processor, coupled to the at least one memory, the processor is configured to cause:
   the controller to send a first action upon detecting a first activity, and a second action upon detecting a second activity.

2. The device of claim 1, wherein the controller presents an IP/Cam record mode input to enable simultaneous, concurrent, or sequential capture of the media as acquired by the one or more digital image sensors and the one or more sensor modules.

3. The device of claim 2, wherein the first activity comprises of a user selection for collecting the media from the one or more image sensors and the one or more sensor modules, and the first action comprises of controlling the one or more image sensors and the one or more sensor modules to collect the media sequentially, or simultaneously, for a predetermined amount of time.

4. The device of claim 2, wherein the second activity comprises of a user selection for merging, discarding, or saving separately the selected media from the one or more image sensors and the one or more sensor modules, and the second action comprises of controlling the one or more image sensors and the one or more sensor modules to collect further media sequentially, or simultaneously, for a predetermined amount of time.

5. The device of claim 1, wherein the controller selectively stores the media collected from the one or more image sensors, the one or more sensor modules, or both in the at least one memory of the device.

6. A method comprising:
   collecting media by either one or more image sensors of a smart device, one or more sensor modules, or both;
   displaying user options by the smart device for toggling, selecting, or merging media acquired by the one or more image sensors of the smart device, the one or more sensor modules, or both, wherein at least one of the one or more sensor modules is exterior to the smart device, and wherein the at least one exterior sensor module moves, rotates, tilts, or pans according to changes in the axis orientation of the smart device;
   sending control commands to move, rotate, tilt, or pan the at least one exterior sensor modules responsive to an axis orientation of the smart device;
   presenting a rotate mode input icon on the display of the smart device to indicate at least one or more sensor modules being operable to move, rotate, tilt, or pan; and
   presenting an IP/Cam mode input icon to toggle single and multi-view camera mode to display the media, wherein the media comprises of a space information, an individual information, or both, of a surrounding environment as acquired by one or more image sensors and the one or more sensor modules;
   detecting, by the smart device, a first activity and second activity; and
   performing a first action and second action, by the smart device, based on the detecting.

7. The method of claim 6, further comprising displaying a list of user operations actions for live or recorded media for the selected at least one of the one or more image sensors, the one or more sensor modules, or both.

8. The method of claim 6, further comprising sending control commands by the smart device to move, rotate, tilt, or pan at least one of the one or more sensor modules.

9. The method of claim 8, further comprising moving, rotating, tilting, or panning the one or more sensor modules, wherein the commands are in response to an axis orientation of the smart device, and wherein the one or more sensor modules move, rotate, tilt, or pan according to changes in the axis orientation of the device.

10. The method of claim 9, wherein the first activity comprises of a user selection for collecting the media from the one or more image sensors and the one or more sensor modules, and the first action comprises of controlling the one or more image sensors and the one or more sensor modules to collect the media sequentially, or simultaneously, for a predetermined amount of time.

11. The method of claim 10, wherein the second activity comprises of a user selection for merging, discarding, or saving separately the selected media from the one or more image sensors and the one or more sensor modules, and the second action comprises of controlling the one or more image sensors and the one or more sensor modules to collect further media sequentially, or simultaneously, for a predetermined amount of time.

12. A non-transitory machine-readable medium comprising instructions stored therein, which, when executed by one or more processors of a processing system cause the one or more processors to perform operations comprising:
collecting media by either one or more image sensors of a smart device, one or more sensor modules, or both;
displaying user options by the smart device for toggling, selecting, or merging media acquired by the one or more image sensors of the smart device, the one or more sensor modules, or both, wherein at least one of the one or more sensor modules is exterior to the smart device, and wherein the at least one exterior sensor module moves, rotates, tilts, or pans according to changes in the axis orientation of the smart device;
sending control commands to move, rotate, tilt, or pan the at least one exterior sensor modules responsive to an axis orientation of the smart device;
presenting a rotate mode input icon on the display of the smart device to indicate at least one or more sensor modules being operable to move, rotate, tilt, or pan; and
presenting an IP/Cam mode input icon to toggle single and multi-view camera mode to display the media, wherein the media comprises of a space information, an individual information, or both, of a surrounding environment as acquired by one or more image sensors and the one or more sensor modules;
detecting, by the smart device, a first activity and second activity; and
performing a first action and second action, by the smart device, based on the detecting.

13. The non-transitory machine-readable medium of claim 12, further comprising displaying a list of user operations actions for live or recorded media for the selected at least one of the one or more image sensors, the one or more sensor modules, or both.

14. The non-transitory machine-readable medium of claim 12, further comprising sending control commands by the smart device to move, rotate, tilt, or pan at least one of the one or more sensor modules.

15. The non-transitory machine-readable medium of claim 14, further comprising moving, rotating, tilting, or panning the one or more sensor modules, wherein the commands are in response to an axis orientation of the smart device, and wherein the one or more sensor modules move, rotate, tilt, or pan according to changes in the axis orientation of the device.

16. The non-transitory machine-readable medium of claim 15, wherein the first activity comprises of a user selection for collecting the media from the one or more image sensors and the one or more sensor modules, and the first action comprises of controlling the one or more image sensors and the one or more sensor modules to collect the media sequentially, or simultaneously, for a predetermined amount of time.

17. The non-transitory machine-readable medium of claim 16, wherein the second activity comprises of a user selection for merging, discarding, or saving separately the selected media from the one or more image sensors and the one or more sensor modules, and the second action comprises of controlling the one or more image sensors and the one or more sensor modules to collect further media sequentially, or simultaneously, for a predetermined amount of time.

* * * * *